United States Patent Office 2,772,976
Patented Dec. 4, 1956

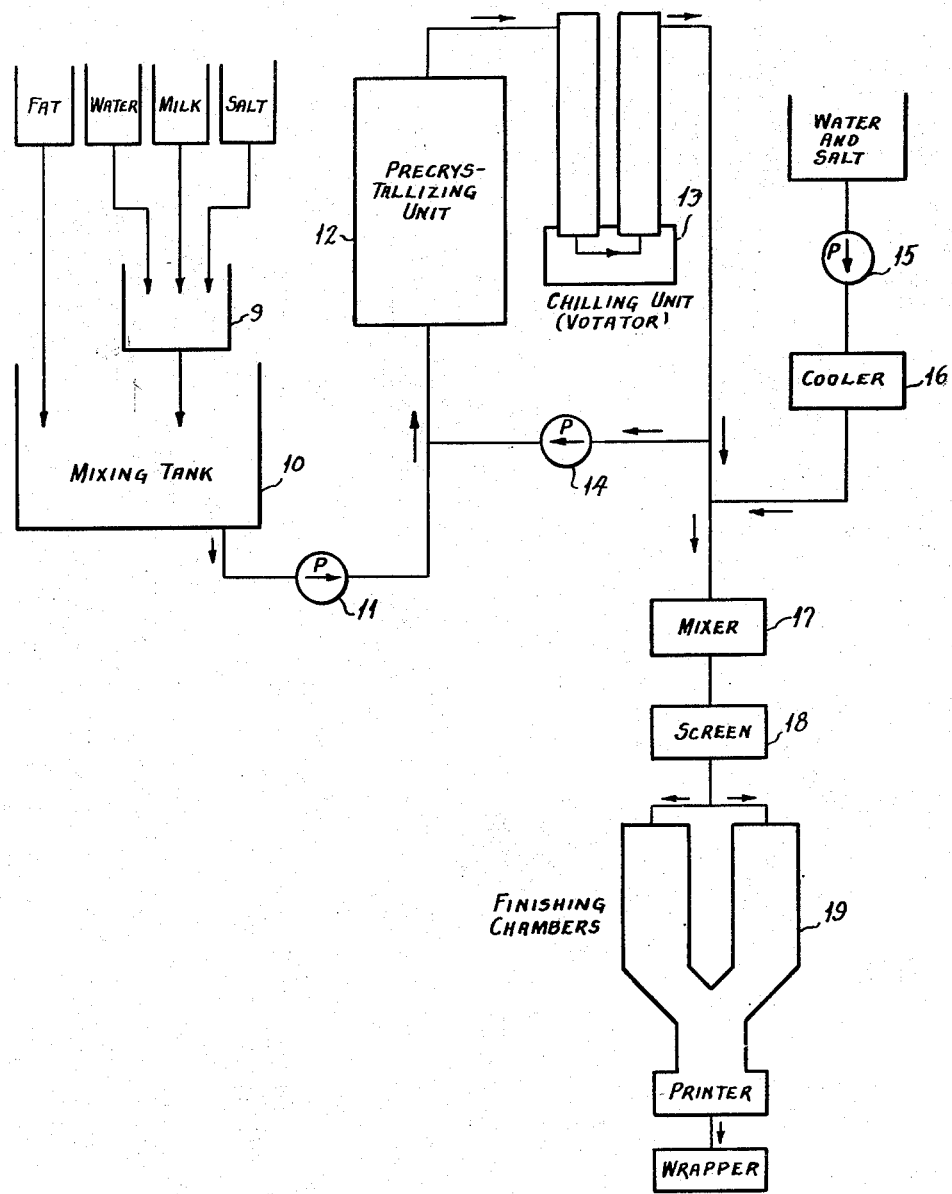

2,772,976
METHOD OF MAKING MARGARINE

Werner H. Schmidt, Englewood, N. J., and Stanley I. Shafer, Melrose, Mass., assignors to Lever Brothers Company, New York, N. Y., a corporation of Maine Application February 18, 1953, Serial No. 337,457

7 Claims. (Cl. 99—122)

This invention relates to an improved margarine and to a method of making it.

Basically, margarine is made by admixing and emulsifying fat with an aqueous ingredient, solidifying the emulsion, and then packaging the resulting product.

The term "fat," as understood in the art and used herein, includes rendered animal fat, or oil or stearin derived therefrom, any or all of which may be hydrogenated; any vegetable food fat or oil, or stearin derived therefrom, any or all of which may be hydrogenated; and any combination of such ingredients.

The term "aqueous ingredient" is generally understood in the art to include cream milk, skim milk, a combination of dried skim milk and water, and any mixture of two or more of these materials.

Formerly, the solidification was accomplished by spraying the emulsified mixture into a trough or vat of water maintained at a temperature in the immediate vicinity of the freezing point. This method had a number of important disadvantages in that it resulted in a washing out of a portion of the milk, occluding in the emulsion an uncertain amount of cooling water, exposing the emulsion to air-borne and water-borne bacterial contamination, and being wasteful of refrigeration.

Subsequently, a method was developed and widely adopted wherein the emulsified materials are solidified by contact with the exterior surface of an internally cooled rotating drum or chill roll. This method likewise suffers from the disadvantages of exposing the emulsion and the chilling surface to air-borne bacterial contamination and being wasteful of refrigeration.

More recently, the trend has been to utilize a closed chilling apparatus, such as that generally known as the "Votator" or "A" unit, in the solidification of the emulsion. This apparatus comprises one or more thin walled nickel tubes surrounded by a cooling medium such as evaporating liquid ammonia and provided with rapidly rotating internal blades. The emulsion passing through the apparatus is supercooled and maintained in a liquid condition by the agitation of the blades. Upon leaving the chilling apparatus, the supercooled emulsion may be subjected to screening, is solidified and finally, printed and wrapped.

It has been the constant aim of margarine manufacturers to produce a product having a texture, spreadability, general appearance and flavor closely resembling that of butter. At room temperature, butter is both readily spreadable and brittle, i. e., a print breaks rather than bends and the surfaces at the break have a crumbly or granular appearance. In addition, country butter is characterized by the presence of globules of free moisture. In margarine, the attributes of spreadability and brittleness have been obtainable separately but not together. Margarine products that are readily spreadable have a greasy texture and are therefore not brittle. Margarine products that have the desired brittleness are not readily spreadable.

It has now been found possible to produce a margarine containing globules of free moisture and having both a brittleness and spreadability practically indistinguishable from that of butter. The new product, as compared with prior margarine products, contains globules of free moisture, has a somewhat coarser texture, granular structure, and an improved feel on the palate that is instantly apparent.

The feel of margarine on the palate is indicated by its capillary slip melting point, a high capillary slip melting point being indicative of an unpleasant greasy feel and a lower slip melting point being indicative of the ability of the material to melt quickly upon contact with the tongue. The capillary slip melting point (described in Bailey, "Melting and Solidification of Fats," 1950, pp. 79–80), as the name implies, is measured by immersing, one at a time in containers of water maintained at an ascending series of temperatures, capillary tubes containing the product and noting the temperature of the water which causes the product to slip upward 1/8" in the capillary tube within 20 seconds due to the hydrostatic head and the softening of the product. The improvement in margarine obtained in accordance with the present invention is indicated by the fact that the capillary slip melting points of margarine produced in accordance with the method of the invention are several degrees C. lower than those obtainable with the same starting materials by conventional Votator methods. Whereas the capillary slip melting points of margarines made by the conventional Votator process have consistently been within about 1.5° C. of the Wiley melting point of the initial fat, the slip melting point of margarine made by the method of this invention is about 3° C. or more below the Wiley melting point of the initial fat. The Wiley melting point is well known in the art and is discussed in the aforementioned text of Bailey, page 111.

In accordance with the method of this invention, margarine is made from preselected proportions of fat, milk, salt and water, it being understood that the term "milk" includes cream, milk, skimmed milk and milk powder and that the preselected proportion of water is reduced to the extent that the milk component, if in liquid form, contains water. All of the fat is initially emulsified with all of the milk solids, a major part of the preselected proportion of the salt and part of the preselected proportion of water. The emulsion so formed, which may if desired be stabilized by homogenization in accordance with techniques well known in the art, is thereupon subjected to mild cooling and agitation to precrystallize the higher melting glycerides therein, then to rapid chilling and agitation to supercool it, and thereafter the supercooled emulsion is blended with the remainder of the preselected proportions of salt and water prior to the finishing operations, such as screening, setting, printing and wrapping.

In the preferred embodiment of the invention, the method is carried out in a continuous manner and a portion of the supercooled emulsion is recycled, before blending with the remainder of the salt and water, for contact with the initial emulsion to effect, in whole or in part, the cooling thereof to precrystallize the higher melting glycerides in the initial emulsion.

The step of mild cooling and agitation in order to precrystallize the high melting glycerides in the fat is preferably carried out in a picker box or so-called "B" shortening unit, which in essence consists of one or more cylinders provided with beaters to maintain the contents in a moderate degree of agitation, as described, for example, in Bailey, "Industrial Oil and Fat Products" (1945), page 703

The cooling may be accomplished by any suitable means. In the preferred embodiment of this invention, the initial stream of emulsion is cooled by admixing it with a continuous stream of recycled and supercooled emulsion. Optimum precrystallization temperatures, depending upon the particular fat or fats utilized, range from about 73 to 93° F. These temperatures are somewhat higher than the temperatures to which the stock is cooled for precrystallization because of the heat of crystallization that is liberated during the crystallization process and are not low enough to precrystallize a substantial proportion of the lower melting point glycerides.

Upon leaving the precrystallization unit the emulsion is subjected to rapid chilling and agitation, preferably in a Votator or "A" unit.

The remainder of the preselected proportions of salt and water is cooled, preferably to a temperature of the order about 20 to 30° F., and continuously injected into and blended with the supercooled emulsion from the chilling unit and the resulting mix is subjected to screening, printing and wrapping, the printing and wrapping preferably being carried out with a Wilson compensator, such as described and illustrated in U. S. Patent 2,474,136, preceding the molding head of the print former and the wrapping machine.

When the cooling of the initial stream of emulsion to effect precrystallization is carried out by admixing it with a recycled stream of supercooled emulsion, the remainder of the preselected proportions of salt and water is preferably injected into the stream of supercooled material at a point after the bleed-off point for the recycled material. The ratio by weight of recycled emulsion to initial emulsion may vary widely, depending upon the precrystallization temperature of the higher melting glycerides in the particular fat initially used, the initial temperature of the emulsion entering the system and the temperature of the supercooled emulsion leaving the chilling unit. The maximum amount of recycled emulsion is dependent upon the capacity of the chilling unit in relation to the production rate of margarine that is desired. Thus, for example, while it is entirely feasible to recycle, say 75% or more of the supercooled emulsion leaving the chilling unit, so that the ratio of recycled emulsion to initial emulsion will be 3:1 or higher, such a high rate of recycling is not desirable for the reason that it reduces the production rate of margarine to a small fraction of the capacity of the chilling unit. On the other hand, the ratio of recycled emulsion to initial emulsion should, in the circumstances, be at least high enough to cool the initial emulsion sufficiently to effect precrystallization of the higher melting glycerides. Therefore, when the recycled emulsion is utilized as the sole coolant inducing precrystallization, it is usually preferred, in order to arrive at a desirable balance between amount of precrystallization and economy of operation, to maintain the ratio of recycled to initial emulsion between about 10:100 and 150:100.

It is to be understood, of course that when other cooling means are utilized in place of recycling to effect precrystallization, recycling is unnecessary and that when such other cooling means are used in conjunction with recycling, the ratio of recycled to initial material may be lower than 10:100 and approach 0:100.

The ratio of amount of water added to the initial emulsion to the amount blended with the supercooled emulsion may vary between about 9:11 and about 9:1 and is preferably between about 1:1 and 3:1. The proportion of salt added initially to the emulsion is a major portion of the total salt added, i. e., more than half and preferably above about 75% thereof.

The primary advantage of the method of the invention, in addition to the fact that it results in the production of a margarine product containing globules of free water and having an unexpected combination of spreadability and brittleness, is that the disproportionately high salt content in the initial emulsion provides maximum protection against bacterial action on the milk solids.

The advantages and utility of the method of the invention and the uniqueness of the product obtained thereby will become more apparent from the following detailed description made with reference to the accompanying schematic flow sheet illustrating a preferred embodiment of the method.

Referring now to the drawing, all of the fat and milk and part of the salt and water utilized in the process are introduced, in the proper preselected proportions, into a mixing tank 10, the milk, salt and water being preferably premixed in any suitable device such as a vessel 9. The materials emulsified in tank 10 are then pumped by means of a pump 11 through a precrystallizing or "B" unit 12 and a chilling unit such as a "Votator" or "A" unit 13. A preselected proportion of the chilled emulsion leaving the chilling unit 13 is recycled, by means of pump 14, for addition to the initial emulsion prior to entry thereof into the precrystallization unit 12. The balance of the total requirements of salt and water is pumped, by means of a pump 15, through a cooler 16 and injected into the supercooled emulsion from the chilling unit 13 after a portion of the supercooled emulsion has been withdrawn for recycling. The supercooled emulsion and injected salt and water are then thoroughly admixed in a mixer or blender 17, subjected to mild working in a screen 18 and passed to finishing chambers 19 for printing and wrapping, as indicated.

It will readily be understood by those skilled in the art that other ingredients, such as emulsifying agent, preservative, vitamins, antispattering agent, flavoring material, coloring material and the like, some of which are essential and others of which are optional ingredients, may be added in such proportions and at such stages in the process as are well known in the art.

Example 240 lbs. of fat having a Wiley melting point of 35.5° C. were admixed in a mixing tank with 34.2 lbs. of water in which 4.8 lbs. of milk solids and 6.0 lbs. of salt had previously been dissolved. The resulting emulsion was pumped by means of a feed pump through a "B" unit for precrystallization and then through a Votator or "A" unit for rapid chilling and agitation. A portion of the chilled emulsion leaving the chilling unit was recycled by means of a pump at a rate of 50 lbs. of chilled emulsion for every 100 lbs. of warm emulsion supplied by the feed pump. 1.5 lbs. of salt dissolved in 13.5 lbs. of water were pumped through a cooler, injected into the remainder of the stream of chilled emulsion and blended therewith. The water pump was controlled so that the finished product had the required moisture content, never containing less than 80% fat. The blended mixture was then subjected to screening in a thimble screen and directed to a Wilson compensator, print former and wrapping machine for printing and wrapping.

After the operations had reached equilibrium conditions, the temperatures of the emulsion in the various stages were found to be 98° F. in the mixing tank, 85° F. at the entrance to the chilling unit and 40° F. at the exit of the chilling unit. The salt-water solution was initially at a temperature of 50° F. and was reduced to 30° F. in the water cooler. The temperature of the print was 60° F.

The product was found to contain globules of free moisture and to have a granular appearance and a capillary slip melting point of 32.5° C.

By way of comparison, the identical process, except for the fact that all of the milk, salt and water was added initially, resulted in a margarine product containing no detectable globules of free moisture and having a greasy texture and a capillary slip melting point of 33.6° C. The improvement in properties of the margarine obtained by the method of this example is surprising in view of the widespread belief in the art that the consistency of margarine is dependent principally upon the fats initially used in its manufacture and is influenced but little by ordinary variations in methods of solidifying and emulsifying the product.

It is to be understood, of course, the numerous variations and modifications will suggest themselves to those skilled in the art on reading this description. All such variations and modifications are intended to be included within the scope of the invention as defined in the appended claims.

We claim:

1. A method of making margarine from preselected proportions of fat, milk, salt and water which comprises cooling and agitating an emulsion of the fat, milk, a major part of the preselected proportion of salt and a part of the preselected proportion of water to precrystallize the higher melting glycerides therein, rapidly chilling and agitating said emulsion to supercool it, and blending the remainder of the preselected proportions of salt and water with the supercooled emulsion.

2. The method defined in claim 1 wherein the salt and water blended with the supercooled emulsion is cooled before blending.

3. The method defined in claim 1 wherein the ratio of amount of water in the initial emulsion to amount of water blended with the supercooled emulsion ranges between about 9:11 and about 9:1.

4. The method defined in claim 1 wherein the ratio of amount of water in the initial emulsion to amount of water blended with the supercooled emulsion ranges between about 1:1 and about 3:1.

5. The method defined in claim 1 wherein the cooling of the emulsion to precrystallize the higher melting glycerides is accomplished by recycling a portion of the supercooled emulsion and bringing it into contact with the initial emulsion.

6. The method defined in claim 5 wherein the ratio by weight of recycled emulsion to initial emulsion is between about 10:100 and about 150:100.

7. The method defined in claim 5 wherein the remainder of the preselected proportions of salt and water are blended with the nonrecycled portion of the supercooled emulsion.

References Cited in the file of this patent

UNITED STATES PATENTS

| 625,478 | Uhlenblock | May 23, 1899 |
| 1,934,564 | Seymour | Nov. 7, 1933 |
| 2,024,647 | Joyce | Dec. 17, 1935 |
| 2,330,986 | Miller et al. | Oct. 5, 1943 |